(12) United States Patent
Kim

(10) Patent No.: US 10,999,036 B2
(45) Date of Patent: May 4, 2021

(54) METHOD AND APPARATUS FOR DOWNLINK COMMUNICATION IN COMMUNICATION SYSTEM

(71) Applicant: ELECTRONICS AND TELECOMMUNICATIONS RESEARCH INSTITUTE, Daejeon (KR)

(72) Inventor: Ji Hyung Kim, Daejeon (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 52 days.

(21) Appl. No.: 16/263,402

(22) Filed: Jan. 31, 2019

(65) Prior Publication Data

US 2019/0253220 A1 Aug. 15, 2019

(30) Foreign Application Priority Data

Feb. 14, 2018 (KR) .................. 10-2018-0018682
Jan. 29, 2019 (KR) .................. 10-2019-0011168

(51) Int. Cl.
*H04L 5/00* (2006.01)
*H04W 76/27* (2018.01)
(Continued)

(52) U.S. Cl.
CPC ......... *H04L 5/0053* (2013.01); *H04B 7/0617* (2013.01); *H04J 13/0003* (2013.01);
(Continued)

(58) Field of Classification Search
CPC .... H04B 7/0617; H04B 7/0695; H04B 7/088; H04J 11/0079; H04J 13/0003;
(Continued)

(56) References Cited

U.S. PATENT DOCUMENTS 9,521,664 B2    12/2016  Chen et al.
2016/0142189 A1  5/2016  Shin et al.
(Continued)

OTHER PUBLICATIONS

Ericsson, "draftCR to 38.211 capturing the Jan. 18 ad-hoc meeting agreements", R1-1801291, 3GPP TSG-RAN1 Meeting AH18-01, Vancouver, Canada, Jan. 22-26, 2018.
(Continued)

*Primary Examiner* — Robert J Lopata
(74) *Attorney, Agent, or Firm* — LRK Patent Law Firm

(57) ABSTRACT

An operation method of a base station in a communication system includes transmitting, to a terminal, a radio resource control (RRC) message including transmission configuration information (TCI)-state configuration information including information indicating a starting beam index and an ending beam index and reference signal related information; transmitting, to the terminal, a first downlink control information (DCI) including a first TCI indicating the starting beam index and first resource allocation information; and transmitting, to the terminal, a first physical downlink shared channel (PDSCH) through a resource indicated by the first resource allocation information by using a starting beam indicated by the first TCI.

16 Claims, 9 Drawing Sheets

(51) Int. Cl.
*H04J 13/00* (2011.01)
*H04L 1/18* (2006.01)
*H04W 72/04* (2009.01)
*H04B 7/06* (2006.01)
*H04W 16/28* (2009.01)

(52) U.S. Cl.
CPC .............. *H04L 1/1832* (2013.01); *H04L 5/00* (2013.01); *H04W 72/046* (2013.01); *H04W 76/27* (2018.02); *H04W 16/28* (2013.01)

(58) Field of Classification Search
CPC .. H04J 2011/0006; H04L 1/1832; H04L 5/00; H04L 5/0023; H04L 5/0044; H04L 5/0053; H04W 16/28; H04W 72/046; H04W 76/27
USPC ........................................................ 370/329
See application file for complete search history.

(56) References Cited

U.S. PATENT DOCUMENTS

| | | |
|---|---|---|
| 2016/0330004 A1 | 11/2016 | Kim et al. |
| 2017/0078065 A1 | 3/2017 | Nam et al. |
| 2017/0207932 A1 | 7/2017 | Kim et al. |
| 2018/0041319 A1 | 2/2018 | Cheng et al. |
| 2018/0041991 A1 | 2/2018 | Lee et al. |
| 2018/0343653 A1* | 11/2018 | Guo ....................... H04L 5/0053 |
| 2019/0069285 A1* | 2/2019 | Chandrasekhar .... H04B 7/0695 |
| 2019/0230545 A1* | 7/2019 | Liou ..................... H04W 24/10 |
| 2019/0254120 A1* | 8/2019 | Zhang ................... H04W 80/02 |
| 2019/0306924 A1* | 10/2019 | Zhang ................. H04W 72/046 |
| 2019/0313429 A1* | 10/2019 | Cheng ................... H04W 48/12 |
| 2019/0387440 A1* | 12/2019 | Yiu .................. H04W 36/0072 |
| 2020/0068548 A1* | 2/2020 | Guan ........................ H04L 5/00 |
| 2020/0137741 A1* | 4/2020 | Zhou ..................... H04W 80/02 |
| 2020/0146059 A1* | 5/2020 | Cirik ..................... H04L 5/0098 |
| 2020/0267571 A1* | 8/2020 | Park ................... H04W 72/0446 |
| 2020/0337058 A1* | 10/2020 | Song ..................... H04W 80/02 |
| 2020/0344742 A1* | 10/2020 | Chen ................... H04W 72/046 |
| 2020/0351841 A1* | 11/2020 | Cirik ..................... H04L 5/0048 |

OTHER PUBLICATIONS

3rd Generation Partnership Project; Technical Specification Group Radio Access Network; NR; Multiplexing and channel coding, 3GPP TS 38.212 v15.0.1, Feb. 2018.

3rd Generation Partnership Project; Technical Specification Group Radio Access Network; NR; Physical layer procedures for control, 3GPP TS 38.213 v15.0.0, Feb. 2018.

3rd Generation Partnership Project; Technical Specification Group Radio Access Network; NR; Physical layer procedures for data, 3GPP TS 38.214 v15.0.0, Feb. 2018.

* cited by examiner

METHOD AND APPARATUS FOR DOWNLINK COMMUNICATION IN COMMUNICATION SYSTEM

CROSS-REFERENCE TO RELATED APPLICATIONS

This application claims priority to Korean Patent Application Nos. 10-2018-0018682, filed Feb. 14, 2018, and 10-2019-0011168, filed Jan. 29, 2019, in the Korean Intellectual Property Office (KIPO), the entire contents of which are hereby incorporated by reference.

BACKGROUND

1. Field of the Invention

The present disclosure relates to downlink communication, and more particularly, to a method for beam management and a method for reference signal transmission in a downlink communication procedure.

2. Description of Related Art

With the development of information and communication technology, various wireless communication technologies are being developed. Typical wireless communication technologies include long term evolution (LTE), new radio (NR), etc. defined in the 3rd generation partnership project (3GPP) standard. The LTE may be one of the fourth generation (4G) wireless communication technologies, and the NR may be one of the fifth generation (5G) wireless communication technologies.

The 5G communication system (e.g., the communication system supporting the NR) using a frequency band (e.g., frequency band above 6 GHz) higher than a frequency band (e.g., frequency band below 6 GHz) of the 4G communication system (e.g., the communication system supporting the LTE) as well as the frequency band of the 4G communication system is being considered for processing of rapidly increasing wireless data after commercialization of the 4G communication system. The 5G communication system can support enhanced mobile broadband (eMBB) services, ultra-reliable and low-latency communication (URLLC) service, and massive machine type communication (mMTC) services.

Communications may be performed using a single beam in the 4G communication system, and communications may be performed using one or more beams (e.g., multi beam) in the 5G communication system. In the 5G communication system supporting multiple beams, a beam management procedure for selecting and adjusting beams used for transmission of control information and data may be introduced.

In the 5G communication system, a quasi-co-location (QCL) of a physical downlink shared channel (PDSCH) may be explicitly indicated by a transmission configuration indication (TCI) included in downlink control information (DCI). Alternatively, the QCL of the PDSCH may be implicitly indicated based on a QCL of a physical downlink control channel (PDCCH). However, in the current 5G communication system, a TCI update procedure is not explicitly defined.

Meanwhile, in the 5G communication system, a demodulation-reference signal (DM-RS) may be transmitted on all subcarriers in a specific symbol in a resource block (RB). In this case, since utilization efficiency of frequency resources is lowered, a method for lowering the density of the DM-RS is required.

SUMMARY

Accordingly, embodiments of the present disclosure provide a method and an apparatus for implicitly updating a transmission configuration indication (TCI) in a communication system.

Accordingly, embodiments of the present disclosure also provide a method and an apparatus for reference signal configuration for improving frequency resource utilization efficiency in a communication system.

According to embodiments of the present disclosure, an operation method of a base station in a communication system may comprise transmitting, to a terminal, a radio resource control (RRC) message including transmission configuration information (TCI)-state configuration information including information indicating a starting beam index and an ending beam index and reference signal related information; transmitting, to the terminal, a first downlink control information (DCI) including a first TCI indicating the starting beam index and first resource allocation information; and transmitting, to the terminal, a first physical downlink shared channel (PDSCH) through a resource indicated by the first resource allocation information by using a starting beam indicated by the first TCI.

The operation method may further comprise transmitting, to the terminal, a second DCI including second resource allocation information; and transmitting, to the terminal, a second PDSCH through a resource indicated by the second resource allocation information by using a beam #n determined among the starting beam and the ending beam according to a preconfigured rule.

The operation method may further comprise transmitting, to the terminal, a third DCI including a second TCI and third resource allocation information; and transmitting, to the terminal, a third PDSCH through a resource indicated by the third resource allocation information by using a beam estimated based on the second TCI, wherein the second TCI indicates the reference signal related information instead of the starting beam index.

The RRC message may further include a TCI update indicator indicating that an implicit TCI update is performed.

The RRC message may further include a beam interval indicating an interval at which a beam is updated, wherein a beam used for communications between the base station and the terminal is determined among the starting beam to the ending beam according to the interval indicated by the beam interval.

The RRC message may further include beam change information indicating a time required for a change from a current beam to a next beam, wherein a beam used for communications between the base station and the terminal is changed to another beam after a lapse of the time indicated by the beam change information.

The RRC message may further include a TCI update type indicating a beam update scheme, the ending beam may be used for communications between the base station and the terminal before receiving a second TCI when the RRC message indicates a TCI update type 1 and a beam used for communications between the base station and the terminal is updated to the ending beam, and the ending beam may be updated to the starting beam in a cyclic shift manner when the RRC message indicates a TCI update type 2 and a beam used for communications between the base station and the terminal is updated to the ending beam.

The RRC message may further include a demodulation reference signal (DM-RS) interval indicating an allocation interval of DM-RSs, and the DM-RSs may be transmitted to the terminal through the first PDSCH according to the allocation interval indicated by the DM-RS interval.

The RRC message may further include a code division multiplexing (CDM) separation parameter indicating a number of CDM groups allocated to one resource block (RB), and demodulation reference signals (DM-RSs) belonging to the CDM group may be transmitted to the terminal through the first PDSCH according to an allocation scheme determined based on information indicated by the CDM separation parameter.

The RRC message may further include a code division multiplexing (CDM) interval indicating an allocation interval of demodulation reference signals (DM-RSs) belonging to a same CDM group, and the DM-RSs may be transmitted to the terminal through the first PDSCH according to the allocation interval indicated by the CDM interval.

According to embodiments of the present disclosure, an operation method of a terminal in a communication system may comprise receiving, from a base station, a radio resource control (RRC) message including transmission configuration information (TCI)-state configuration information including information indicating a starting beam index and an ending beam index and reference signal related information; receiving, from the base station, a first downlink control information (DCI) including a first TCI indicating the starting beam index and first resource allocation information to the terminal; and receiving, from the base station, a first physical downlink shared channel (PDSCH) through a resource indicated by the first resource allocation information by using a starting beam indicated by the first TCI.

The operation method may further comprise receiving, from the base station, a second DCI including second resource allocation information; and receiving, from the base station, a second PDSCH through a resource indicated by the second resource allocation information by using a beam #n determined among the starting beam and the ending beam according to a preconfigured rule.

The operation method may further comprise receiving, from the base station, a third DCI including a second TCI and third resource allocation information; and receiving, from the base station, a third PDSCH through a resource indicated by the third resource allocation information by using a beam estimated based on the second TCI, wherein the second TCI indicates the reference signal related information instead of the starting beam index.

The RRC message may further include a TCI update indicator indicating that an implicit TCI update is performed.

The RRC message may further include a beam interval indicating an interval at which a beam is updated, wherein a beam used for communications between the base station and the terminal is determined among the starting beam to the ending beam according to the interval indicated by the beam interval.

The RRC message may further include beam change information indicating a time required for a change from a current beam to a next beam, wherein a beam used for communications between the base station and the terminal is changed to another beam after a lapse of the time indicated by the beam change information.

The RRC message may further include a TCI update type indicating a beam update scheme, the ending beam may be used for communications between the base station and the terminal before receiving a second TCI when the RRC message indicates a TCI update type 1 and a beam used for communications between the base station and the terminal is updated to the ending beam, and the ending beam may be updated to the starting beam in a cyclic shift manner when the RRC message indicates a TCI update type 2 and a beam used for communications between the base station and the terminal is updated to the ending beam.

When the RRC message further includes a demodulation reference signal (DM-RS) interval indicating an allocation interval of DM-RSs in a frequency domain, the receiving a first PDSCH may comprise receiving the DM-RSs through the first PDSCH according to the allocation interval indicated by the DM-RS interval; and demodulating downlink data received through the first PDSCH based on the DM-RSs.

When the RRC message further includes a code division multiplexing (CDM) separation parameter indicating a number of CDM groups allocated to one resource block (RB), the receiving a first PDSCH may comprise receiving demodulation reference signals (DM-RSs) belonging to the CDM group through the first PDSCH according to an allocation scheme determined based on information indicated by the CDM separation parameter; and demodulating downlink data received through the first PDSCH based on the DM-RSs.

When the RRC message further includes a code division multiplexing (CDM) interval indicating an allocation interval of demodulation reference signals (DM-RSs) belonging to a same CDM group, the receiving a first PDSCH may comprise receiving the DM-RSs through the first PDSCH according to the allocation interval indicated by the CDM interval; and demodulating downlink data received through the first PDSCH based on the DM-RSs.

According to the embodiments of the present disclosure, the configuration information for implicitly updating the TCI may be transmitted through at least one of an RRC message, a MAC CE, and a DCI. The implicit TCI update may be performed based on the configuration information at each of the base station and the terminal.

Therefore, when a beam used for communications between the base station and the terminal needs to be changed according to a communication environment (e.g., movement of the terminal), the communications between the base station and the terminal can be performed using a beam changed according to the implicit TCI update without an additional signaling procedure. This can reduce a signaling overhead in the communication system. Also, since the DM-RS is not allocated to all subcarriers in the RB in the frequency domain, so that utilization efficiency of frequency resources can be improved, and the performance of the communication system can be improved.

BRIEF DESCRIPTION OF DRAWINGS

Embodiments of the present disclosure will become more apparent by describing in detail embodiments of the present disclosure with reference to the accompanying drawings, in which.

DETAILED DESCRIPTION

Figure 1:
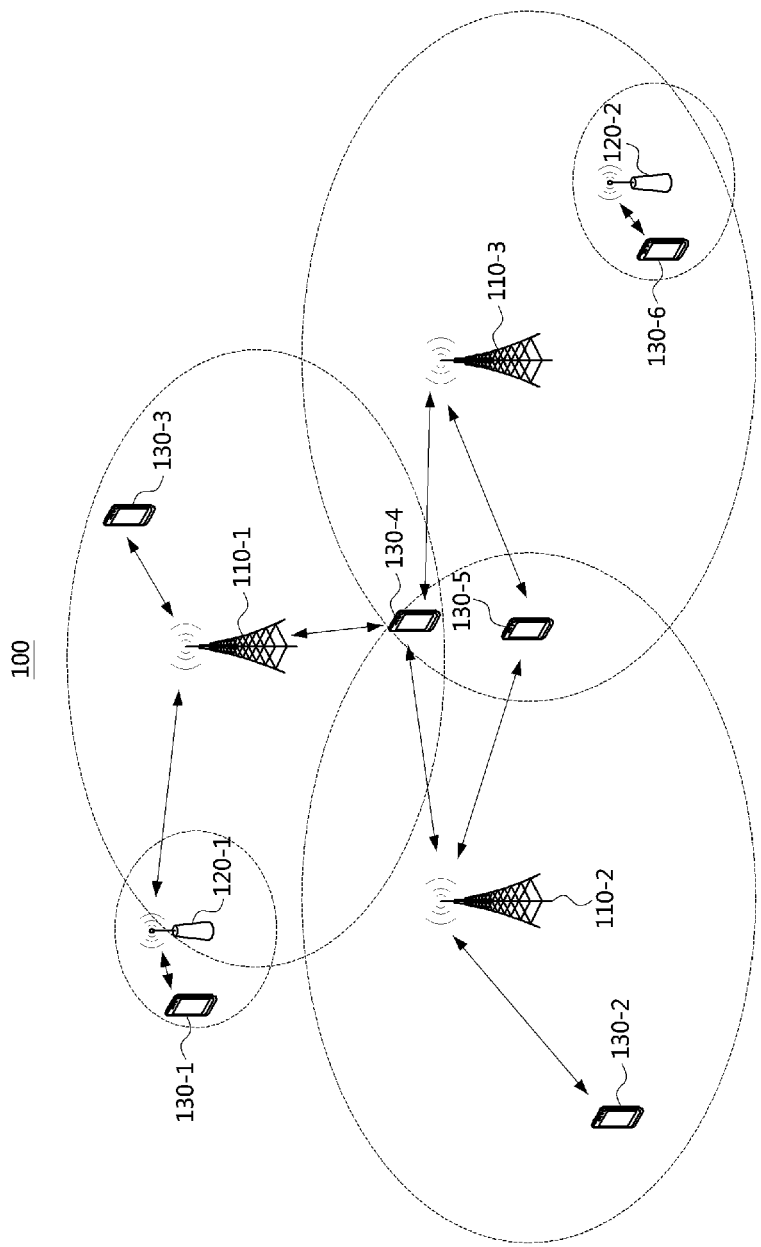
FIG. 1 is a conceptual diagram illustrating a first embodiment of a communication system.

Embodiments of the present disclosure are disclosed herein. However, specific structural and functional details disclosed herein are merely representative for purposes of describing embodiments of the present disclosure, however, embodiments of the present disclosure may be embodied in many alternate forms and should not be construed as limited to embodiments of the present disclosure set forth herein.

Accordingly, while the present disclosure is susceptible to various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, embodiments of the present disclosure will be described in greater detail with reference to the accompanying drawings. In order to facilitate general understanding in describing the present disclosure, the same components in the drawings are denoted with the same reference signs, and repeated description thereof will be omitted.

Hereinafter, a communication system to which embodiments according to the present disclosure will be described. However, the communication systems to which the embodiments according to the present disclosure are applied are not restricted to what will be described below. That is, the embodiments according to the present disclosure may be applied to various communication systems. Here, the communication system may be used in the same sense as a communication network.

FIG. 1 is a conceptual diagram illustrating a first embodiment of a cellular communication system.

Referring to FIG. 1, a communication system 100 may comprise a plurality of communication nodes 110-1, 110-2, 110-3, 120-1, 120-2, 130-1, 130-2, 130-3, 130-4, 130-5, and 130-6. The plurality of communication nodes may support the 4G communication (e.g., LTE, LTE-Advanced (LTE-A), etc.), the 5G communication (e.g., NR), or the like. The 4G communication may be performed in a frequency band below 6 GHz, and the 5G communication may be performed in a frequency band above 6 GHz as well as the frequency band below 6 GHz.

The plurality of communication nodes may support $4^{th}$ generation (4G) communication (e.g., long term evolution (LTE), LTE-advanced (LTE-A)), or $5^{th}$ generation (5G) communication defined in the $3^{rd}$ generation partnership project (3GPP) standard. The 4G communication may be performed in a frequency band below 6 gigahertz (GHz), and the 5G communication may be performed in a frequency band above 6 GHz. For example, for the 4G and 5G communications, the plurality of communication nodes may support at least one communication protocol among a code division multiple access (CDMA) based communication protocol, a wideband CDMA (WCDMA) based communication protocol, a time division multiple access (TDMA) based communication protocol, a frequency division multiple access (FDMA) based communication protocol, an orthogonal frequency division multiplexing (OFDM) based communication protocol, an orthogonal frequency division multiple access (OFDMA) based communication protocol, a single carrier FDMA (SC-FDMA) based communication protocol, a non-orthogonal multiple access (NOMA) based communication protocol, and a space division multiple access (SDMA) based communication protocol.

In addition, the communication system 100 may further include a core network. When the communication system 100 supports the 4G communication, the core network may comprise a serving gateway (S-GW), a packet data network (PDN) gateway (P-GW), a mobility management entity (MME), and the like. When the communication system 100 supports the 5G communication, the core network may comprise a user plane function (UPF), a session management function (SMF), an access and mobility management function (AMF), and the like. Also, each of the plurality of communication nodes may have the following structure.

Figure 2:
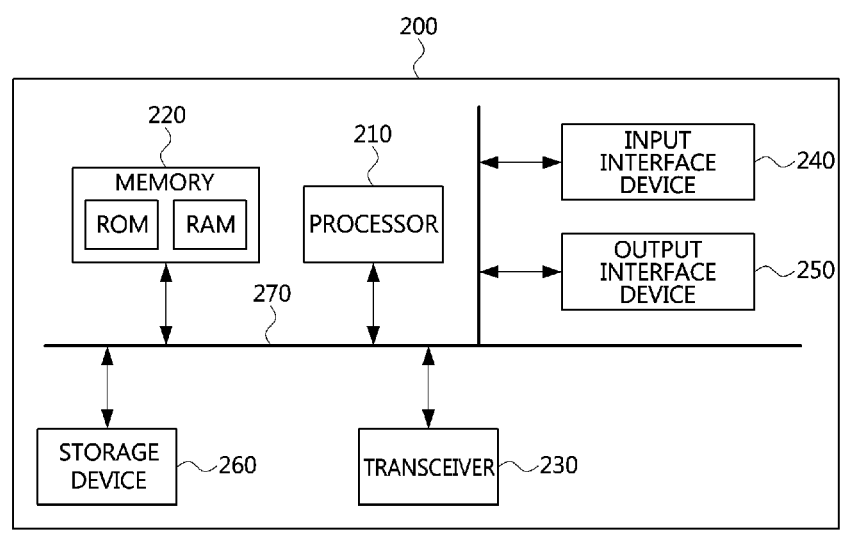
FIG. 2 is a block diagram illustrating a first embodiment of a communication node constituting a communication system.

FIG. 2 is a block diagram illustrating a first embodiment of a communication node constituting a cellular communication system.

Referring to FIG. 2, a communication node 200 may comprise at least one processor 210, a memory 220, and a transceiver 230 connected to the network for performing communications. Also, the communication node 200 may further comprise an input interface device 240, an output interface device 250, a storage device 260, and the like. Each component included in the communication node 200 may communicate with each other as connected through a bus 270.

However, each component included in the communication node 200 may be connected to the processor 210 via an individual interface or a separate bus, rather than the common bus 270. For example, the processor 210 may be connected to at least one of the memory 220, the transceiver 230, the input interface device 240, the output interface device 250, and the storage device 260 via a dedicated interface.

The processor 210 may execute a program stored in at least one of the memory 220 and the storage device 260. The processor 210 may refer to a central processing unit (CPU), a graphics processing unit (GPU), or a dedicated processor on which methods in accordance with embodiments of the present disclosure are performed. Each of the memory 220 and the storage device 260 may be constituted by at least one of a volatile storage medium and a non-volatile storage medium. For example, the memory 220 may comprise at least one of read-only memory (ROM) and random access memory (RAM).

Referring again to FIG. 1, the communication system 100 may comprise a plurality of base stations 110-1, 110-2, 110-3, 120-1, and 120-2, and a plurality of terminals 130-1, 130-2, 130-3, 130-4, 130-5, and 130-6. Each of the first base station 110-1, the second base station 110-2, and the third base station 110-3 may form a macro cell, and each of the fourth base station 120-1 and the fifth base station 120-2 may form a small cell. The fourth base station 120-1, the third terminal 130-3, and the fourth terminal 130-4 may belong to cell coverage of the first base station 110-1. Also, the second terminal 130-2, the fourth terminal 130-4, and the fifth terminal 130-5 may belong to cell coverage of the second base station 110-2. Also, the fifth base station 120-2, the fourth terminal 130-4, the fifth terminal 130-5, and the sixth terminal 130-6 may belong to cell coverage of the third base station 110-3. Also, the first terminal 130-1 may belong to cell coverage of the fourth base station 120-1, and the sixth terminal 130-6 may belong to cell coverage of the fifth base station 120-2.

Here, each of the plurality of base stations 110-1, 110-2, 110-3, 120-1, and 120-2 may refer to a Node-B, a evolved Node-B (eNB), a base transceiver station (BTS), a radio base station, a radio transceiver, an access point, an access node, or the like. Also, each of the plurality of terminals 130-1, 130-2, 130-3, 130-4, 130-5, and 130-6 may refer to a user equipment (UE), a terminal, an access terminal, a mobile terminal, a station, a subscriber station, a mobile station, a portable subscriber station, a node, a device, or the like.

Meanwhile, each of the plurality of base stations 110-1, 110-2, 110-3, 120-1, and 120-2 may operate in the same frequency band or in different frequency bands. The plurality of base stations 110-1, 110-2, 110-3, 120-1, and 120-2 may be connected to each other via an ideal backhaul or a non-ideal backhaul, and exchange information with each other via the ideal or non-ideal backhaul. Also, each of the plurality of base stations 110-1, 110-2, 110-3, 120-1, and 120-2 may be connected to the core network through the ideal or non-ideal backhaul. Each of the plurality of base stations 110-1, 110-2, 110-3, 120-1, and 120-2 may transmit a signal received from the core network to the corresponding terminal 130-1, 130-2, 130-3, 130-4, 130-5, or 130-6, and transmit a signal received from the corresponding terminal 130-1, 130-2, 130-3, 130-4, 130-5, or 130-6 to the core network.

Also, each of the plurality of base stations 110-1, 110-2, 110-3, 120-1, and 120-2 may support a multi-input multi-output (MIMO) transmission (e.g., a single-user MIMO (SU-MIMO), a multi-user MIMO (MU-MIMO), a massive MIMO, or the like), a coordinated multipoint (CoMP) transmission, a carrier aggregation (CA) transmission, a transmission in unlicensed band, a device-to-device (D2D) communications (or, proximity services (ProSe)), or the like. Here, each of the plurality of terminals 130-1, 130-2, 130-3, 130-4, 130-5, and 130-6 may perform operations corresponding to the operations of the plurality of base stations 110-1, 110-2, 110-3, 120-1, and 120-2 (i.e., the operations supported by the plurality of base stations 110-1, 110-2, 110-3, 120-1, and 120-2). For example, the second base station 110-2 may transmit a signal to the fourth terminal 130-4 in the SU-MIMO manner, and the fourth terminal 130-4 may receive the signal from the second base station 110-2 in the SU-MIMO manner. Alternatively, the second base station 110-2 may transmit a signal to the fourth terminal 130-4 and fifth terminal 130-5 in the MU-MIMO manner, and the fourth terminal 130-4 and fifth terminal 130-5 may receive the signal from the second base station 110-2 in the MU-MIMO manner.

The first base station 110-1, the second base station 110-2, and the third base station 110-3 may transmit a signal to the fourth terminal 130-4 in the CoMP transmission manner, and the fourth terminal 130-4 may receive the signal from the first base station 110-1, the second base station 110-2, and the third base station 110-3 in the CoMP manner. Also, each of the plurality of base stations 110-1, 110-2, 110-3, 120-1, and 120-2 may exchange signals with the corresponding terminals 130-1, 130-2, 130-3, 130-4, 130-5, or 130-6 which belongs to its cell coverage in the CA manner. Each of the base stations 110-1, 110-2, and 110-3 may control D2D communications between the fourth terminal 130-4 and the fifth terminal 130-5, and thus the fourth terminal 130-4 and the fifth terminal 130-5 may perform the D2D communications under control of the second base station 110-2 and the third base station 110-3.

Hereinafter, a method for implicitly updating a TCI and a method for configuring reference signals in a communication system will be described. Even when a method (e.g., transmission or reception of a signal) to be performed at a first communication node among the communication nodes is described, the corresponding second communication node may perform a method (e.g., reception or transmission of the signal) corresponding to the method performed at the first communication node. That is, when an operation of the terminal is described, the corresponding base station may perform an operation corresponding to the operation of the terminal. Conversely, when an operation of the base station is described, the corresponding terminal may perform an operation corresponding to the operation of the base station.

The communications may be performed using a single beam in the 4G communication system, and the communications may be performed using one or more beams (e.g., multi beam) in the 5G communication system. In the 5G communication system supporting multiple beams, a beam management procedure for selecting and adjusting beams used for transmission of control information and data may be introduced. The beam management procedure may be performed as follows.

The base station may set a 'TCI-PresentInDCI' parameter to an enabled state or a disabled state, and may transmit a radio resource control (RRC) message including the TCI-PresentInDCI parameter. The TCI-PresentInDCI parameter set to the enabled state may indicate that a transmission configuration indication (TCI) field is present in a DCI (e.g., DCI format 1_1). In this case, the size of the TCI field may be 3 bits. The TCI-PresentInDCI parameter set to the disable state may indicate that the TCI field is not present in the DCI. In this case, the size of the TCI field may be 0 bit.

When a TCI-PresentInDCI parameter for a control resource set (CORESET) scheduling a physical downlink shared channel (PDSCH) is set to the enabled state, the terminal may determine that a TCI field is present in a DCI included in a physical downlink control channel (PDCCH) received through the CORESET. When a TCI-PresentInDCI parameter for a CORESET scheduling a PDSCH is set to the disabled state, or when a PDSCH is scheduled by a DCI format 1_0, in order to determine a PDSCH antenna port quasi-co-location (QCL), the terminal may assume that a TCI state for the PDSCH is the same as a TCI state for the CORESET through which the corresponding PDCCH is transmitted.

When the TCI-PresentInDCI parameter is set to the enabled state, the terminal may use the TCI state indicated by the TCI field included in the DCI to determine the PDSCH antenna port QCL. When a time offset between a reception timing of the DCI and a reception timing of the PDSCH scheduled by the DCI is equal to or greater than a preset threshold value (e.g., Threshold-Sched-Offset), the terminal may assume that antenna ports (e.g., DM-RSs corresponding to the antenna ports) belonging to one DM-RS port group of a PDSCH of a serving cell are quasi-co-located with RS(s) in a RS group related to QCL type parameter(s) indicated by the TCI state.

When the TCI-PresentInDCI parameter is set to the enabled state or the disabled state, and the time offset between the reception timing of the DCI and the reception timing of the PDSCH scheduled by the DCI is smaller than the preset threshold value, the terminal may assume that antenna ports (e.g., DM-RSs corresponding to the antenna ports) belonging to one DM-RS port group of a PDSCH of a serving cell are quasi-co-located with a TCI state (e.g., RS corresponding to the TCI state) used for a PDCCH QCL of the lowest CORESET-ID in the latest slot. The embodiments described above may be applied to a phase tracking RS (PT-RS).

Meanwhile, when the beam management procedure is performed in the communication system, data may be transmitted after being precoded. The DM-RS used to demodulate the data may be precoded identically to the data. The DM-RS may be mapped to resources as follows. The DM-RS may be mapped to physical resources according to a configuration type 1 or a configuration type 2. The configuration type 1 or the configuration type 2 may be indicated by a 'DL-DMRS-config-type' parameter, and the DL-DMRS-config-type parameter may be transmitted through an RRC message. The DM-RS may be mapped to physical resources in accordance with Equation 1 below.

$$a_{k,l}^{(p_j,\mu)} = \beta_{DMRS}^{PDSCH} r_\lambda^{(p_j)}(2n+k')$$ [Equation 1]

$$k = \begin{cases} 4n + 2k' + \Delta & \text{Configuration type 1} \\ 6n + k' + \Delta & \text{Configuration type 2} \end{cases}$$

$$k' = 0, 1$$

$$l = \bar{l} + l'$$

$$n = 0, 1, \ldots$$

Here, $w_f(k')$, $w_t(l')$, $\Delta$, and $\lambda$ may be defined based on Table 1 and Table 2 below.

TABLE 1

| P | CDM group $\lambda$ | $\Delta$ | $w_f(k')$ $k'=0$ | $w_f(k')$ $k'=1$ | $w_t(l')$ $l'=0$ | $w_t(l')$ $l'=1$ |
|---|---|---|---|---|---|---|
| 1000 | 0 | 0 | +1 | +1 | +1 | +1 |
| 1001 | 0 | 0 | +1 | −1 | +1 | +1 |
| 1002 | 1 | 1 | +1 | +1 | +1 | +1 |
| 1003 | 1 | 1 | +1 | −1 | +1 | +1 |
| 1004 | 0 | 0 | +1 | +1 | +1 | −1 |
| 1005 | 0 | 0 | +1 | −1 | +1 | −1 |
| 1006 | 1 | 1 | +1 | +1 | +1 | −1 |
| 1007 | 1 | 1 | +1 | −1 | +1 | −1 |

TABLE 2

| P | CDM group $\lambda$ | $\Delta$ | $w_f(k')$ $k'=0$ | $w_f(k')$ $k'=1$ | $w_t(l')$ $l'=0$ | $w_t(l')$ $l'=1$ |
|---|---|---|---|---|---|---|
| 1000 | 0 | 0 | +1 | +1 | +1 | +1 |
| 1001 | 0 | 0 | +1 | −1 | +1 | +1 |
| 1002 | 1 | 2 | +1 | +1 | +1 | +1 |
| 1003 | 1 | 2 | +1 | −1 | +1 | +1 |
| 1004 | 2 | 4 | +1 | +1 | +1 | +1 |
| 1005 | 2 | 4 | +1 | −1 | +1 | +1 |
| 1006 | 0 | 0 | +1 | +1 | +1 | −1 |
| 1007 | 0 | 0 | +1 | −1 | +1 | −1 |
| 1008 | 1 | 2 | +1 | +1 | +1 | −1 |
| 1009 | 1 | 2 | +1 | −1 | +1 | −1 |
| 1010 | 2 | 4 | +1 | +1 | +1 | −1 |
| 1011 | 2 | 4 | +1 | −1 | +1 | −1 |

Here, $w_f(k')$, $w_t(l')$, $\Delta$, and $\lambda$ may satisfy the following conditions.

Resource elements (REs) may be located in common RBs allocated for PDSCH transmission.

The reference point for k may be as follows:

In transmission of a PDSCH carrying remaining minimum system information (RMSI), k may be a subcarrier #0 of the lowest-numbered common RB in the CORESET configured by a physical broadcast channel (PBCH).

In transmission of a PDSCH without RMSI, k may be a subcarrier #0 of a common RB #0.

The reference point for locations $l_0$ and 1 of the first DM-RS symbol may vary depending on a mapping type. Here, the DM-RS symbol may indicate a symbol to which the DM-RS is mapped.

PDSCH Mapping Type A l may be defined according to the starting point of the slot.
When a 'DL-DMRS-typeA-pos' parameter set by the upper layer is 3, $l_0$ may be 3. When the DL-DMRS-typeA-pos parameter set by the upper layer is not 3, $l_0$ may be 2.

PDSCH Mapping Type B l may be defined according to the starting point of the scheduled PDSCH resource.

$l_0$ may be 0.

According to Table 3 and Table 4 below, the location(s) of the DM-RS symbols may be determined by $\bar{l}$ and a signaled duration between the first symbol in the slot and the last symbol of the PDSCH resource scheduled in the slot for the PDSCH mapping type A, or $\bar{l}$ and a signaled duration of the PDSCH resource scheduled for the PDSCH mapping type B. The embodiment in which a 'DL-DMRS-add-pos' parameter set to 3 may be applied to a case where the DL-DMRS-typeA-pos parameter is set to 2.

TABLE 3

| PDSCH duration (in units of symbols) | DM-RS locations ($\bar{l}$) | | | | | |
|---|---|---|---|---|---|---|
| | PDSCH mapping type A DL-DMRS-add-pos | | | PDSCH mapping type B DL-DMRS-add-pos | | |
| | 0 | 1 | 2 | 0 | 1 | 2 |
| <8 | $l_0$ | — | | $l_0$ | | |
| 8 | $l_0$ | — | | $l_0$ | | |
| 9 | $l_0$ | — | | $l_0$ | | |
| 10 | $l_0$ | $l_0$, 8 | | $l_0$ | | |
| 11 | $l_0$ | $l_0$, 8 | | $l_0$ | | |
| 12 | $l_0$ | $l_0$, 8 | | $l_0$ | | |
| 13 | $l_0$ | $l_0$, 10 | | $l_0$ | | |
| 14 | $l_0$ | $l_0$, 10 | | $l_0$ | | |

TABLE 4

| Single or double symbol DM-RS | $\bar{l}'$ | Supported antenna ports (p) | |
|---|---|---|---|
| | | Configuration type 1 | Configuration type 2 |
| Single | 0 | 1000-1003 | 1000-1005 |
| Double | 0, 1 | 1000-1007 | 1000-1011 |

Meanwhile, bundling of physical resource blocks (PRBs) in the communication system may be configured as follows.

The terminal may assume that a precoding granularity in the frequency domain is a plurality of RBs. A precoding resource block group (PRG) may consist of one or more contiguous PRBs. The size of the PRG (e.g., the number of PRBs in the PRG) may be one of 2, 4 or a scheduled bandwidth. When the PRG is not configured by upper layer parameters 'prb-BundlingEnabled' and 'pdsch-BundleSize', the size of the PRG for each carrier bandwidth may be equal to the size of 2 PRBs. When a PDSCH scheduled by a DCI having a cyclic redundancy check (CRC) scrambled by a system information radio network temporary identifier (SI-RNTI), a random access RNTI (RA-RNTI), a paging RNTI (P-RNTI), or a temporary cell RNTI (TC-RNTI) is received, the terminal may assume that the size of the PRG is equal to the size of 2 PRBs.

When the size of the PRG is equal to the scheduled bandwidth, the terminal may not expect non-contiguous resources to be allocated, and may assume that the same precoding is applied to the allocated resources. When an upper layer parameter 'prbBundling' is set to ON, 2 sets of PRG values may be configured by the upper layer parameter pdsch-BundleSize. The first set may include one or two PRB values, and the PRB value in the first set may be configured among 2, 4, and the scheduled bandwidth. Also, the terminal may not expect the PRB values to be set to (2, 4) in the first set. The second set may include one PRG value.

The DCI format 1_1 may include a PRB bundling size indicator. When the prbBundling parameter is set to OFF, the size of the PRB bundling size indicator may be 0 bit. In this case, when a PDSCH scheduled by the same DCI is received, the terminal may use the PRG value according to the second set of PRG values.

When the prbBundling parameter is set to ON, the size of the PRB bundling size indicator may be 1 bit. When the size of the PRB bundling size indicator is 1 bit and one value is configured for the first group of PRG values, the terminal may use the one value configured for the first group when a PDSCH scheduled by the same DCI is received.

When the size of the PRB bundling size indicator is 1 bit and two values (e.g., (2, scheduled bandwidth) or (4, scheduled bandwidth)) are configured for the first group of PRG values, the terminal may use the follow PRG values when a PDSCH scheduled by the same DCI is received.

If the scheduled PRBs are continuous and the size of the scheduled PRBs is larger than $N_{BW\_P,i}^{size}/2$, the terminal may determine that the PRG value is the scheduled bandwidth.

When the above condition is not satisfied, the terminal may determine that the PRG value is 2 or 4.

When the prbBundling parameter is set to OFF, the PRG value may be set to a single value indicated by the pdsch-BundleSize parameter.

Meanwhile, according to the embodiments described above, the PDSCH QCL may be explicitly indicated by the TCI included in the DCI. Alternatively, the PDSCH QCL may be implicitly indicated based on the TCI for the PDCCH QCL. However, the implicit TCI update may be difficult to be performed in the embodiments described above. The following operations may be performed to support the implicit TCI update in the communication system.

Implicit TCI Update Method

Figure 3:
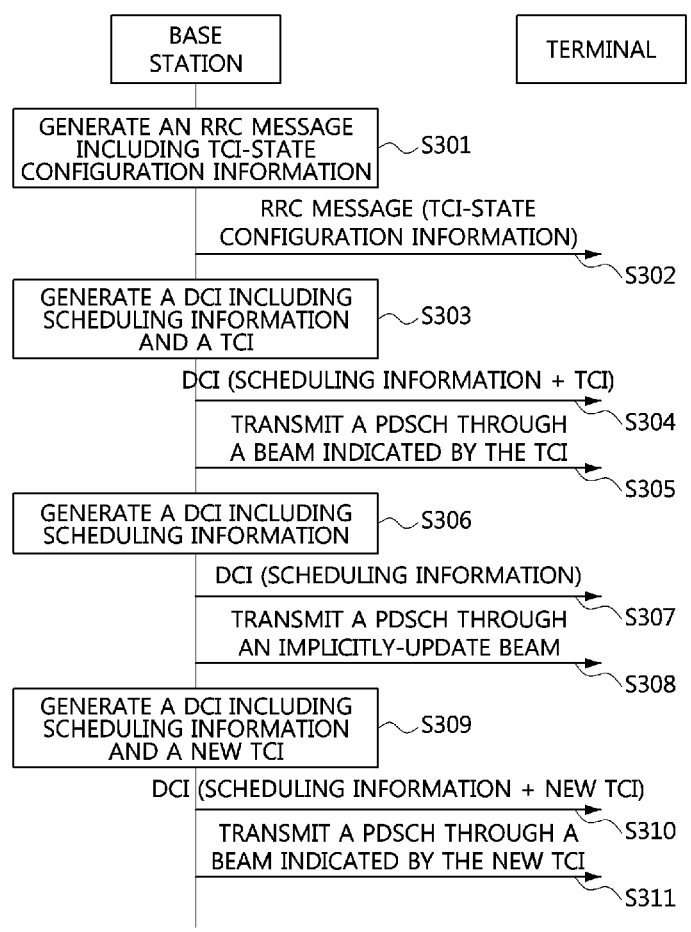
FIG. 3 is a sequence chart illustrating a first embodiment of a TCI update method in a communication system.

FIG. 3 is a sequence chart illustrating a first embodiment of a TCI update method in a communication system.

Referring to FIG. 3, a communication system may include a base station and a terminal. The base station may be the base stations 110-1, 110-2, 110-3, 120-1, and 120-2 shown in FIG. 1, and the terminal may be the terminals 130-1, 130-2, 130-3, 130-4, 130-5, and 130-6 shown in FIG. 1. Each of the base station and the terminal may be configured to be the same as or similar to the communication node 200 shown in FIG. 2.

The base station may generate an RRC message including TCI-state configuration information (S301). The TCI-state configuration information may indicate up to M candidate TCI-states. For example, M may be 8. The TCI-state configuration information may be configured as shown in Table 5 or Table 6 below.

TABLE 5

| TCI-state index | RS information |
|---|---|
| 000 | aa |
| 001 | bb |
| 010 | cc |
| 011 | dd |

TABLE 5-continued

| TCI-state index | RS information |
| --- | --- |
| 100 | ee |
| 101 | Beam #10 |
| 111 | Beam #20 |

TABLE 6

| TCI-state index | RS information |
| --- | --- |
| 000 | aa |
| 001 | bb |
| 010 | cc |
| 011 | dd |
| 100 | ee |
| 101 | ff |
| 111 | Beam #10, Beam #20 |

The TCI-state configuration information may include a TCI-state index (e.g., a TCI-state identifier (ID)) and information on an RS mapped to the TCI-state index. The TCI-state configuration information described in Table 5 may indicate 8 candidate TCI-states, each of the TCI-state indexes 000 to 100 may indicate RS information (e.g., channel state information-reference signal (CSI-RS) related information, synchronization signal block (SSB) related information), the TCI-state index 101 may indicate a staring beam index (e.g., beam #10), and the TCI-state index 111 may indicate an ending beam index (e.g., beam #20).

The TCI-state configuration information described in Table 6 may indicate 8 candidate TCI-states, each of the TCI-state indexes 000 to 101 may indicate RS information (e.g., CSI-RS related information, SSB related information), the TCI-state index 111 may indicate a staring beam index (e.g., beam #10) and an ending beam index (e.g., beam #20). When the implicit TCI update is performed, a beam (e.g., reception beam) of the terminal may be updated from the staring beam to the ending beam indicated by the TCI-state configuration information. Here, the beam (e.g., reception beam) of the terminal may correspond to a beam used by the base station for transmission of the PDSCH.

The RRC message generated in the step S301 may further include one or more of the parameters described in Table 7 below. Alternatively, the parameters described in Table 7 below may be transmitted through a separate RRC message instead of the RRC message generated in the step S301. Alternatively, the parameters described in Table 7 below may be transmitted through a medium access control (MAC) control element (CE) or a DCI.

TABLE 7

| Parameter | Description |
| --- | --- |
| TCI update indicator | indicates whether an implicit TCI update is performed |
| Beam interval | indicates a beam update interval (e.g., TCI update interval) |
| Beam configuration information | indicates indexes of beams located between the starting beam and the ending beam indicated by the TCI-state configuration information |
| Beam change information | indicates a time for a change from a current beam to a next beam (e.g., a time for a change from a current TCI to a next TCI) |
| TCI update type | Type 1: when a beam of the terminal is updated to the ending beam, the beam of the terminal is maintained to be the ending beam before receiving a DCI including a new TCI. |

TABLE 7-continued

| Parameter | Description |
| --- | --- |
| | Type 2: when a beam of the terminal is updated to the ending beam, the beam of the terminal is updated in a cyclic shift manner again from the starting beam to the ending beam. |

When it is indicated by a TCI update indicator that the implicit TCI update is performed, the TCI-state configuration information may include the TCI state index indicating the starting beam index and the ending beam index. When it is indicated by the TCI update indicator that the implicit TCI update is not performed, the TCI-state configuration information may not include the TCI state index indicating the staring beam index and the ending beam index.

The RRC message may include 'beam interval' or 'beam configuration information'. For example, when the RRC message includes the beam interval, the beam configuration information may not be included in the corresponding RRC message. Alternatively, when the RRC message includes the beam configuration information, the beam interval may not be included in the corresponding RRC message. When the staring beam and the ending beam are respectively set to the beam #10 and the beam #20 according to the TCI-state configuration information, and the beam interval is set to 2, the beam of the terminal may be updated in the order of (beam #10→beam #12→beam #14→beam #16→beam #18→beam #20). In this case, 'beam change information' may be a time offset between a time of setting the beam #n and a time of setting the beam #(n+2). Here, n may be 10, 12, 14, 16, or 18. Alternatively, when the beam change information is not configured, the terminal may determine a time offset between the beams in consideration of a time required for a change from the staring beam to the ending beam, and may update the beam using the determined time offset.

When the staring beam and the ending beam are respectively set to the beam #10 and the beam #22 according to the TCI-state configuration information, and the beam configuration information indicates the beam #13, the beam #16 and the beam #19, the beam of the terminal may be updated in the order of (beam #10→beam #13→beam #16→beam #19→beam #22). In this case, the beam change information may be a time offset between a time of setting the beam #n and a time of setting the beam #(n+3). Here, n may be 10, 13, 16, or 19.

Meanwhile, the base station may transmit an RRC message including the TCI-state configuration information (S302). The RRC message may include one or more parameters described in Table 7. Alternatively, the base station may transmit a separate RRC message, a MAC CE, or a DCI including one or more parameters described in Table 7.

The terminal may receive the RRC message from the base station, and obtain the TCI-state configuration information included in the RRC message. Also, the terminal may obtain one or more parameters described in Table 7 by receiving the separate RRC message, the MAC CE, or the DCI from the base station. For example, when the TCI update indicator indicates that the implicit TCI update is performed, the terminal may determine that the implicit TCI update is performed by using one or more of the TCI-state configuration information, the beam interval (or, beam configuration information), the beam change information, and a TCI update type.

Alternatively, when the TCI-state configuration information includes a TCI-state index indicating a beam index (e.g., the staring beam index and the ending beam index), the terminal may determine that the implicit TCI update is performed by using one or more of the TCI-state configuration information, the beam interval (or, beam configuration information), the beam change information, and a TCI update type.

Meanwhile, when downlink data to be transmitted to the terminal exists in the base station, the base station may generate a DCI (e.g., DCI format 1_1) including resource allocation information (e.g., time-frequency resource information) and a TCI (S303). The DCI may further include a DCI format identifier, a hybrid automatic request repeat (HARQ) process number, a transmission power control (TPC) command, an antenna port(s), and the like. When an RRC message including the TCI-PresentInDCI parameter set to the enabled state is transmitted, the base station may generate a DCI format 1_1 including the TCI.

Alternatively, even when the RRC message including the TCI-PresentInDCI parameter set to the disabled state is transmitted, the base station may generate the DCI format 1_1 including the TCI. For example, when the TCI-PresentInDCI parameter is set to the disabled state and the TCI update indicator indicates that the implicit TCI update is performed, the base station may generate the DCI format 1_1 including the TCI. In this case, the terminal may perform the implicit TCI update until the RRC message including the TCI-PresentInDCI parameter set to the enabled state is received. The RRC message including the TCI-PresentInDCI parameter set to the enabled state or the disabled state may be transmitted before step the S302, in the step S302, or after the step S302.

When the TCI-state configuration information is configured as shown in Table 5, the TCI included in the DCI may be set to '101'. Alternatively, when the TCI-state configuration information is configured as shown in Table 6, the TCI included in the DCI may be set to '111'. The base station may transmit the DCI through a PDCCH configured in the CORESET (S304).

The terminal may receive the DCI from the base station by monitoring the PDCCH, and may identify the information elements (e.g., resource allocation information, TCI) included in the DCI. When the TCI included in the DCI is set to 101 described in Table 5 or 111 described in Table 6, the terminal may determine that the PDSCH scheduled by the corresponding DCI is transmitted through the beam #10 (e.g., the staring beam).

The base station may transmit the PDSCH to the terminal through the time-frequency resource scheduled by the DCI by using the beam (e.g., beam #10) indicated by the TCI included in the corresponding DCI (S305). The PDSCH may include DM-RSs and data, and the DM-RSs may be transmitted based on the embodiments shown in FIGS. 6 to 9. The terminal may receive the PDSCH from the base station based on the time-frequency resource and the beam indicated by the DCI. For example, since it is determined that the PDSCH is transmitted through the beam #10, the terminal may receive the PDSCH from the base station by adjusting the reception beam toward the beam #10.

Thereafter, each of the base station and the terminal may implicitly update the TCI based on the starting/ending beam indexes indicated by the TCI-state configuration information and the information elements described in Table 7. For example, the beam #10 may be changed to the beam #12 over time, and downlink data to be transmitted to the terminal at this time may occur at the base station. In this case, the base station may generate a DCI including resource allocation information for the downlink data (S306). Here, the DCI may be a DCI format 1_0 that does not include a TCI. Alternatively, the DCI may be a DCI format 1_1 including a TCI having a size of 0 bits. The base station may transmit the DCI through a PDCCH configured in the CORESET (S307). The terminal may receive the DCI from the base station by monitoring the PDCCH, and may identify the information elements (e.g., resource allocation information) included in the DCI.

The base station may transmit the PDSCH to the terminal through the time-frequency resource scheduled by the DCI by using the beam (e.g., beam #12) configured according to the implicit TCI update (S308). The PDSCH may include DM-RSs and data, and the DM-RSs may be transmitted based on the embodiments shown in FIGS. 6 to 9. Since it is determined that the PDSCH is transmitted through the beam #12 according to the implicit TCI update, the terminal may receive the PDSCH from the base station by adjusting the reception beam toward the beam #12.

Thereafter, each of the base station and the terminal may implicitly update the TCI based on the starting/ending beam indexes indicated by the TCI-state configuration information and the information elements described in Table 7. The base station may transmit a DCI format 1_0 or a DCI format 1_1 including a TCI having a size of 0 bit until transmission of a DCI including a new TCI. The terminal may implicitly update the TCI until it receives a DCI including a new TCI.

When the beam is set to the ending beam indicated by the TCI-state configuration information in each of the base station and the terminal as time elapses, the beam may be configured based on the TCI update type. For example, when the TCI update type 1 described in Table 7 is used, the terminal may maintain the reception beam of the terminal as the ending beam until reception of a DCI including a new TCI. Alternatively, when the TCI update type 2 described in Table 7 is used, the terminal may update the reception beam of the terminal cyclically from the staring beam to the ending beam until reception of a DCI including a new TCI.

Meanwhile, when downlink data to be transmitted to the terminal occurs in the base station and the use of a new TCI is required, the base station may generate a DCI (e.g., DCI format 1_1) including resource allocation information (e.g., time-frequency resource information) of the downlink data and the new TCI (S309). The base station may transmit the DCI through a PDCCH configured in the CORESET (S310). Also, the base station may transmit a PDSCH to the terminal using the beam indicated by the new TCI included in the DCI (S311). The PDSCH may include DM-RSs and the data, and the DM-RSs may be transmitted based on the embodiments shown in FIGS. 6 to 9.

The terminal may receive the DCI from the base station by monitoring the PDCCH, and may identify the information elements (e.g., resource allocation information) included in the DCI. When "the DCI includes a new TCI" or "the DCI includes a TCI indicating other beam and a beam which is expected to be implicitly updated," the terminal may suspend the implicit TCI update, and may determine that the PDSCH is to be transmitted through a beam indicated by the new TCI. Accordingly, the terminal may receive the PDSCH from the base station by setting the reception beam to the beam indicated by the new TCI.

Figure 4:
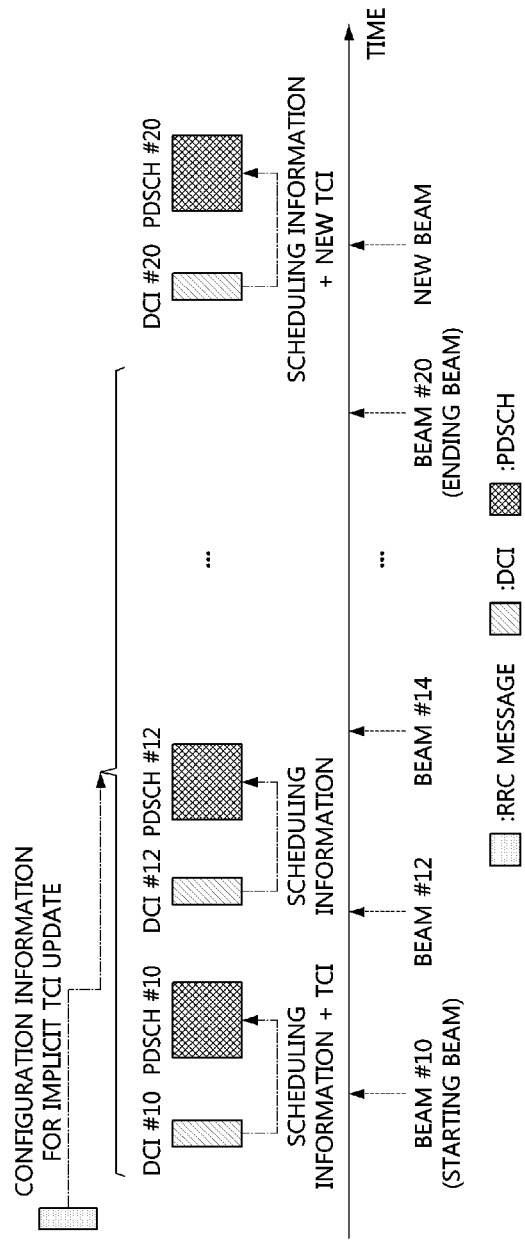
FIG. 4 is a sequence chart illustrating a first embodiment of a downlink communication method based on an implicit TCI update in a communication system.

The embodiments described with reference to FIG. 3 may be illustrated as shown in FIG. 4. FIG. 4 is a sequence chart illustrating a first embodiment of a downlink communication method based on an implicit TCI update in a communication system.

Referring to FIG. 4, an RRC message may be the RRC message transmitted in the step S302 of FIG. 3, a DCI #10 may be the DCI transmitted in the step S304 of FIG. 3, and a PDSCH #10 may be the PDSCH in the step S305 of FIG. 3. Also, a DCI #12 may be the DCI transmitted in the step S307 of FIG. 3, and a PDSCH #12 may be the PDSCH transmitted in the step S308 of FIG. 3. Also, a DCI #20 may be the DCI transmitted in the step S310 of FIG. 3, and a PDSCH #20 may be the PDSCH transmitted in the step S311 of FIG. 3.

Meanwhile, the embodiments described with reference to FIGS. 3 and 4 may also be applied to PT-RS transmission and uplink communication. Further, the embodiments described with reference to FIGS. 3 and 4 may also be applied to a train communication system shown in FIG. 5.

Figure 5:
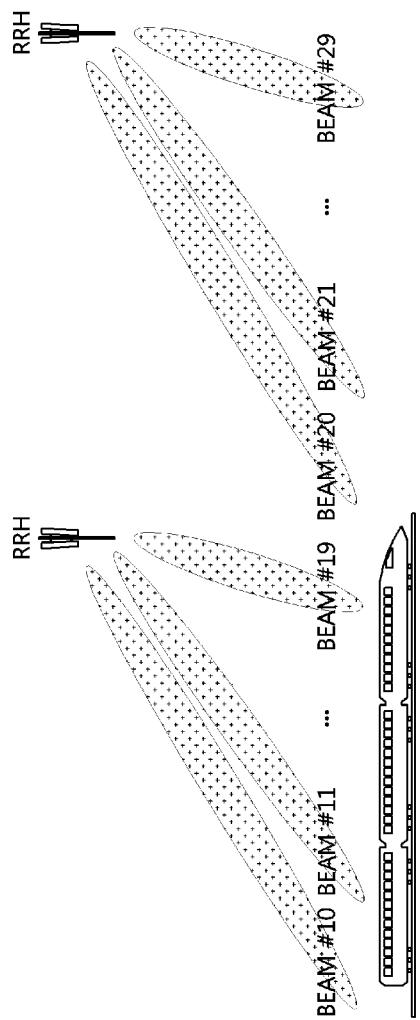
FIG. 5 is a conceptual diagram illustrating a first embodiment of a downlink/uplink communication method in a train communication system.

FIG. 5 is a conceptual diagram illustrating a first embodiment of a downlink/uplink communication method in a train communication system.

Referring to FIG. 5, a plurality of radio remote heads (RRHs) (e.g., transmission reception points (TRPs)) may be installed according to a movement path of a train. Here, the RRH may be the base station shown in FIG. 3. The RRH may perform communications using one or more beams. For example, the RRH may communicate with terminals located in the train using one or more beams. The communications between the RRH and the terminals located in the train may be performed according to the embodiments shown in FIGS. 3 and 4.

DM-RS Mapping/Transmission Method

Precoding may be applied to the downlink data in the embodiments described with reference to FIGS. 3 to 5. The same precoding as the downlink data may be applied to the DM-RS used for demodulating the downlink data. The DM-RS may be mapped to resources as follows.

Figure 6:
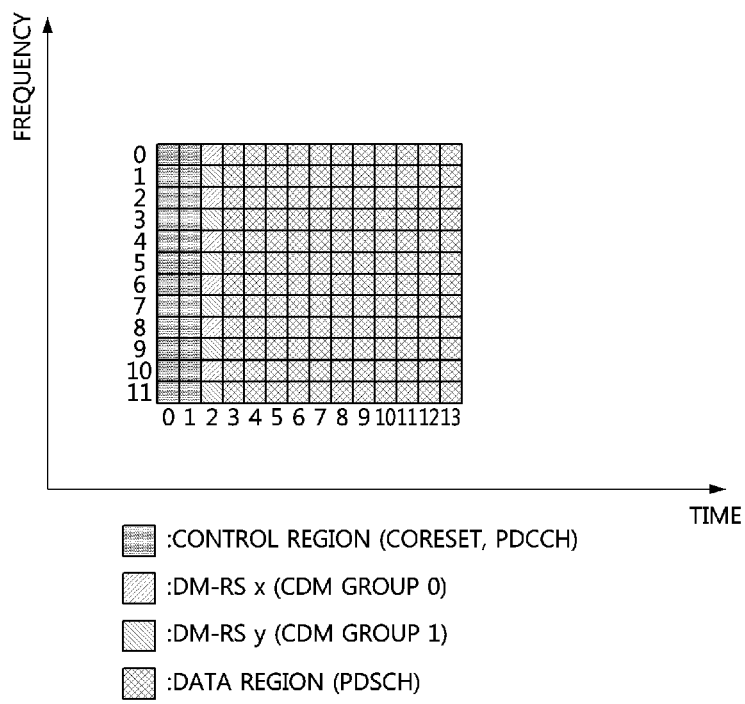
FIG. 6 is a conceptual diagram illustrating a first embodiment of a DM-RS mapping method in a communication system.

FIG. 6 is a conceptual diagram illustrating a first embodiment of a DM-RS mapping method in a communication system.

Referring to FIG. 6, the DM-RS may be mapped to a specific symbol (e.g., symbol #2) in the time domain. The DM-RS may be mapped to all subcarriers (e.g., subcarriers #0 to #11) belonging to the RB in the frequency domain. The mapping locations of the DM-RS may be determined based on a PDSCH mapping type. When a PDSCH mapping type A is used, the first DM-RS may be mapped to the symbol #2 or #3 in the slot. In this case, the first DM-RS may be mapped according to the starting point of the slot boundary. When a PDSCH mapping type B is used, the first DM-RS may be allocated to the first symbol in the region to which data is allocated. In this case, the first DM-RS may be mapped regardless of the starting point of the slot boundary. The PDSCH mapping type may be transmitted through the DCI that schedules the PDSCH to which the PDSCH mapping type is applied.

In each of the PDSCH mapping types A and B, a configuration type 1 and a configuration type 2 may exist. When each of the configuration types 1 and 2 is used, the DM-RS may be composed of 1 or 2 symbols. Also, DM-RS may be added in the time domain.

The embodiment shown in FIG. 6 may be a DM-RS mapping scheme when '10=2' in the configuration type 1 of the PDSCH mapping type A. 2 antenna ports (e.g., antenna ports 1000 and 1001) may be estimated based on DM-RS x mapped to subcarriers #0, #2, #4, #6, #8, and #10. The antenna ports 1000 and 1001 may be a code division multiplexing (CDM) group 0. Also, 2 antenna ports (e.g., antenna ports 1002 and 1003) may be estimated based on DM-RS y mapped to subcarriers #1, #3, #5, #7, #9, and #11.

The antenna ports 1002 and 1003 may be a CDM group 1. Referring to Equation 1 (e.g., n, k', Δ), k may be located for each RB allocated to the terminal. As a result, frequency efficiency may be degraded in a line of sight (LOS) environment (e.g., an environment having low frequency selectivity). Therefore, methods for lowering the density of DM-RS in the frequency domain will be needed. For this, the following embodiments may be applied.

Figure 7:
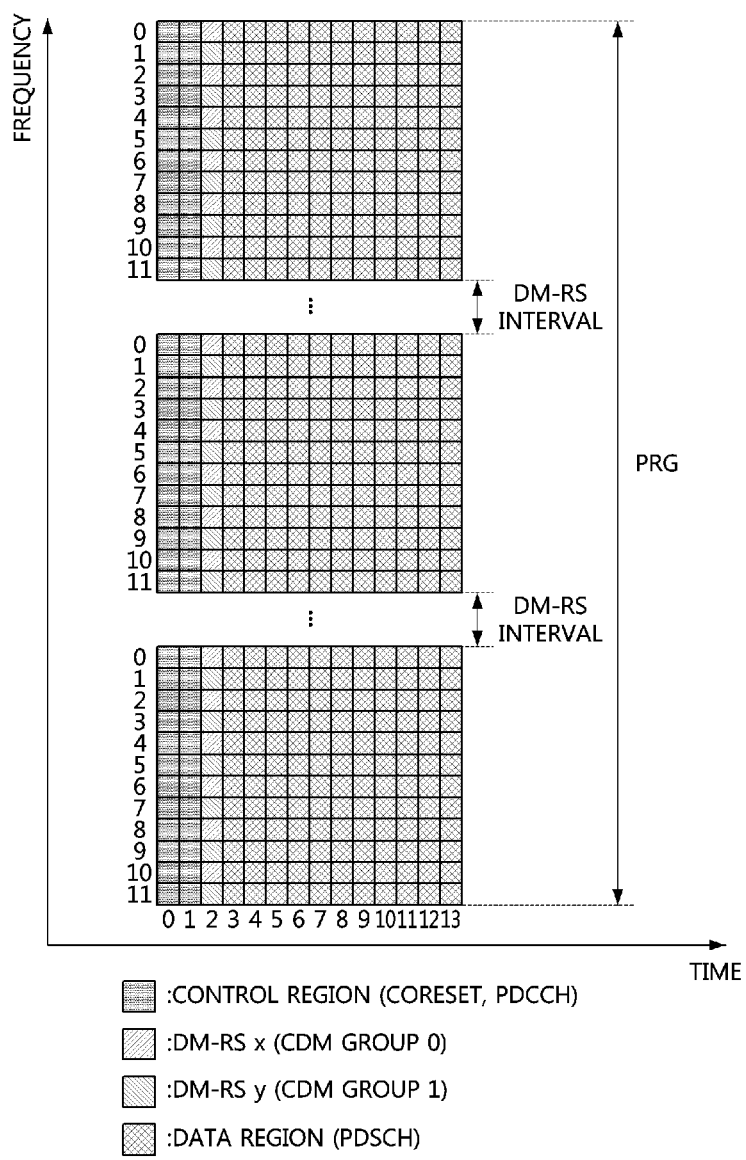
FIG. 7 is a conceptual diagram illustrating a second embodiment of a DM-RS mapping method in a communication system.

FIG. 7 is a conceptual diagram illustrating a second embodiment of a DM-RS mapping method in a communication system.

Referring to FIG. 7, a DM-RS may not be allocated to a specific RB in the PRG. The DM-RS may be allocated to the RB according to a DM-RS interval. The DM-RS interval may be set to the number of RBs. For example, the base station may transmit an RRC message including a 'prbBundling' parameter, a 'pdsch-BundleSize' parameter, and a 'DM-RS interval'. Here, the RRC message may be transmitted in the step S302, before the step S302, or after the step S302 shown in FIG. 3. Alternatively, the DM-RS interval may be transmitted through a MAC CE or a DCI. The prbBundling parameter may be set to ON, and the pdsch-BundleSize parameter may indicate a bundling size. In this case, the DM-RS may be allocated to the starting RB in the PRG, allocated to a RB #n after the DM-RS interval from the starting RB, and a RB #(n+p) after the DM-RS interval from the RB #n. The DM-RS may be allocated to the RB in the PRG according to the DM-RS interval, and the size of the PRG may be indicated by the pdsch-BundleSize parameter included in the RRC message or the PRB bundling size indicator included in the DCI.

The terminal may receive the RRC message from the base station, and identify the prbBundling parameter, the pdsch-BundleSize parameter, and the DM-RS interval included in the RRC message. Alternatively, the terminal may receive a MAC CE or a DCI including the DM-RS interval from the base station.

The base station may transmit the DM-RS to the terminal using DM-RS resources configured by the RRC message, (RRC message+MAC CE), or (RRC message+DCI). The terminal may receive the DM-RS from the base station through the DM-RS resources configured by (RRC message+MAC CE) or (RRC message+DCI), and demodulate the downlink data based on the DM-RS. Here, the PDSCH including the DM-RS and the downlink data may be the PDSCH #10, the PDSCH #12, or the PDSCH #20 shown in FIG. 3. The terminal may assume that the same precoding is applied to the consecutive RBs allocated in the PRG.

For the application of the embodiment shown in FIG. 7, 'n=0, 1, . . . ' in Equation 1 may be changed as shown in Equation 2 below.

$$n = s \times p + q \quad \text{[Equation 2]}$$
$$q = \begin{cases} 0, 1, 2 & \text{configuration type 1} \\ 0, 1 & \text{configuration type 2} \end{cases}$$

Here, s may be the number of subcarriers per RB. For example, s may be 12. Also, p may be the DM-RS interval.

Figure 8:
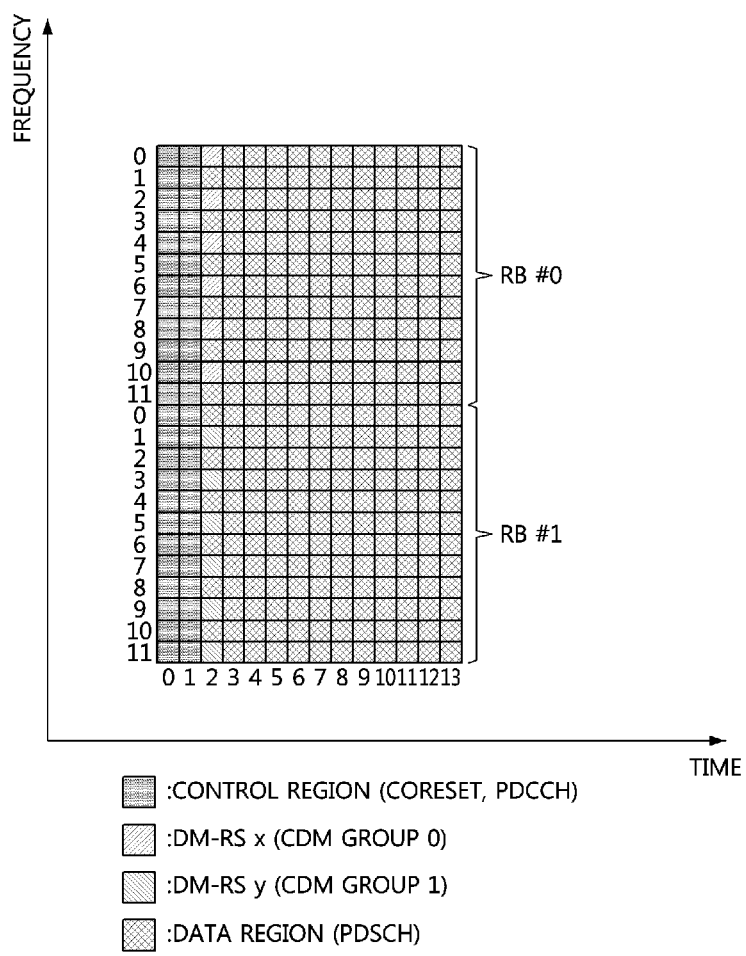
FIG. 8 is a conceptual diagram illustrating a third embodiment of a DM-RS mapping method in a communication system.

FIG. 8 is a conceptual diagram illustrating a third embodiment of a DM-RS mapping method in a communication system.

Referring to FIG. 8, a DM-RS of one CDM group may be allocated to one RB. For example, a DM-RS (e.g., DM-RS x) belonging to the CDM group 0 may be allocated to the RB

0 and a DM-RS (e.g., DM-RS y) belonging to the CDM group 1 may be allocated to the RB #1. In this case, the base station may transmit an RRC message, a MAC CE, or a DCI including a CDM separation parameter. Here, the RRC message may be transmitted in the step S302, before the step S302, or after the step S302 shown in FIG. 3.

The CDM separation parameter may indicate the number of CDM groups allocated to one RB. The CDM separation parameter set to 1 may indicate that a DM-RS belonging to one CDM group is allocated to one RB. Also, the base station may transmit the DM-RS interval with the CDM separation parameter. In this case, when the DM-RS belonging to the CDM group 0 is allocated to the RB #0, the DM-RS belonging to the CDM group 1 may be allocated to an RB after the DM-RS interval from the RB #0.

The terminal may receive the CDM separation parameter by receiving the RRC message, the MAC CE, or the DCI from the base station. Also, the terminal may obtain the DM-DS interval from the base station. The terminal may identify arrangement of the CDM group (e.g., DM-RS) in the RBs in the PRG based on the CDM separation parameter or the (CDM separation parameter+DM-RS interval), and receive the DM-RS based on the identified result. The terminal may demodulate the downlink data using the DM-RS. Here, the PDSCH including the DM-RS and the downlink data may be the PDSCH #10, #12, or #20 shown in FIG. 3.

The embodiment shown in FIG. 8 may be applied not only to the configuration type 1 but also to the configuration type 2. When the PRB bundling size in the configuration type 2 is 4 RBs or the scheduled bandwidth, the embodiment shown in FIG. 8 may be applied to the configuration type 2.

For the application of the embodiment shown in FIG. 8, A in Equation 1 may be changed as shown in Equation 3 below.

$$\Delta'=s\times\lambda+\Delta \quad \text{[Equation 3]}$$

Here, s may be the number of subcarriers per RB. For example, s may be 12. Also, λ may be a CDM group index.

Figure 9:
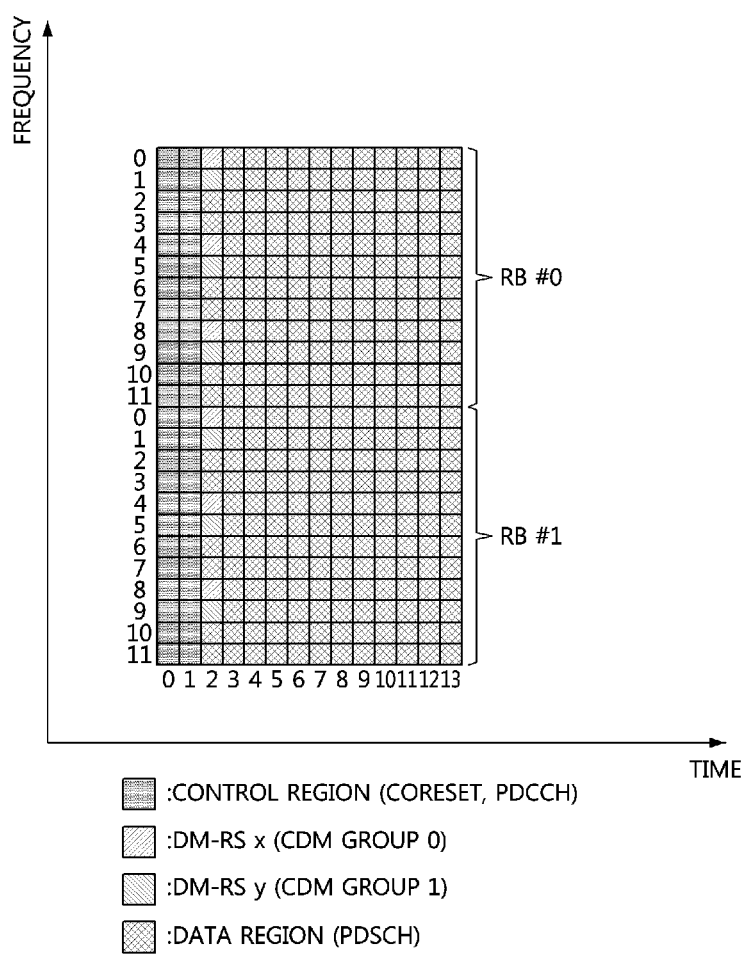
FIG. 9 is a conceptual diagram illustrating a fourth embodiment of a DM-RS mapping method in a communication system.

FIG. 9 is a conceptual diagram illustrating a fourth embodiment of a DM-RS mapping method in a communication system.

Referring to FIG. 9, a DM-RS belonging to one CDM group may be mapped to a plurality of RBs. 2 CDM groups may be mapped to one RB in the configuration type 1, and 3 CDM groups may be mapped to one RB in the configuration type 2. For example, the base station may transmit an RRC message, a MAC CE, or a DCI including a CDM interval to the terminal. Here, the RRC message may be transmitted in the step S302, before the step S302, or after the step shown in FIG. 3.

The CDM interval may indicate a mapping interval between DM-RSs belonging to the same CDM group in the frequency domain. The mapping interval may be set on a subcarrier basis. For example, when the mapping interval is 4 subcarriers, the DM-RS x belonging to the CDM group 0 may be allocated to the subcarriers #0, #4 and #8 of the RB #0 and the subcarriers #0, #4, and #8 of the RB #1. Also, the DM-RS y belonging to the CDM group 1 may be allocated to the subcarriers #1, #5, and #9 of the RB #0 and the subcarriers #1, #5, and #9 of the RB #9.

The terminal may receive the CDM interval by receiving an RRC message, a MAC CE, or a DCI from the base station. The terminal may identify arrangement of the CDM group (e.g., DM-RS) in the RBs in the PRG based on the CDM interval, and may receive the DM-RS based on the identified result. The terminal may demodulate the downlink data using the DM-RS. Here, the PDSCH including the DM-RS and the downlink data may be the PDSCH #10, #12, or #20 shown in FIG. 3.

The above embodiments may be applied not only to the configuration type 1 of the PDSCH mapping type A but also to the configuration type 2 of the PDSCH mapping type A and the configuration type 1-2 of the PDSCH mapping type B. Also, the above embodiments may be applied to uplink communication and may be applied to the train communication system shown in FIG. 5.

The embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software.

Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the embodiments of the present disclosure, and vice versa.

While the embodiments of the present disclosure and their advantages have been described in detail, it should be understood that various changes, substitutions and alterations may be made herein without departing from the scope of the present disclosure.

What is claimed is:

1. An operation method of a base station in a communication system, the operation method comprising:
   transmitting, to a terminal, a radio resource control (RRC) message including transmission configuration information (TCI)-state configuration information including information indicating a starting beam index and an ending beam index, reference signal related information, and a TCI update indicator indicating that an implicit TCI update is performed;
   transmitting, to the terminal, a first downlink control information (DCI) including first resource allocation information, wherein the first DCI does not include a field indicating a specific TCI; and
   when the implicit TCI update is performed and the first DCI does not include the field indicating the specific TCI, transmitting, to the terminal, a first physical downlink shared channel (PDSCH) through a resource indicated by the first resource allocation information by using a beam #n determined among the starting beam to the ending beam according to a rule preconfigured between the base station and the terminal for the implicit TCI update.

2. The operation method according to claim 1, further comprising:
   transmitting, to the terminal, a second DCI including a first TCI and second resource allocation information; and
   transmitting, to the terminal, a second PDSCH through a resource indicated by the second resource allocation information by using a beam estimated based on the first TCI, wherein the first TCI indicates the reference signal related information instead of the starting beam index.

3. The operation method according to claim 1, wherein the RRC message further includes a beam interval indicating an interval at which a beam is updated, wherein a beam used for communications between the base station and the terminal is determined among the starting beam to the ending beam according to the interval indicated by the beam interval.

4. An operation method of a base station in a communication system the operation method comprising:
transmitting, to a terminal, a radio resource control (RRC) message including transmission configuration information (TCI)-state configuration information including information indicating a starting beam index and an ending beam index, reference signal related information, and beam change information indicating a time required for a change from a current beam to a next beam;
transmitting, to the terminal, a first downlink control information (DCI) including first resource allocation information; and
transmitting, to the terminal, a first physical downlink shared channel (PDSCH) through a resource indicated by the first resource allocation information by using a beam #n determined among the starting beam to the ending beam according to a preconfigured rule,
wherein a beam used for communications between the base station and the terminal is changed to another beam after a lapse of the time indicated by the beam change information.

5. The operation method according to claim 1, wherein the RRC message further includes a TCI update type indicating a beam update scheme, the ending beam is used for communications between the base station and the terminal before receiving a first TCI when the RRC message indicates a TCI update type 1 and a beam used for communications between the base station and the terminal is updated to the ending beam, and the ending beam is updated to the starting beam in a cyclic shift manner when the RRC message indicates a TCI update type 2 and a beam used for communications between the base station and the terminal is updated to the ending beam.

6. The operation method according to claim 1, wherein the RRC message further includes a demodulation reference signal (DM-RS) interval indicating an allocation interval of DM-RSs, and the DM-RSs are transmitted to the terminal through the first PDSCH according to the allocation interval indicated by the DM-RS interval.

7. The operation method according to claim 1, wherein the RRC message further includes a code division multiplexing (CDM) separation parameter indicating a number of CDM groups allocated to one resource block (RB), and demodulation reference signals (DM-RSs) belonging to the CDM group are transmitted to the terminal through the first PDSCH according to an allocation scheme determined based on information indicated by the CDM separation parameter.

8. The operation method according to claim 1, wherein the RRC message further includes a code division multiplexing (CDM) interval indicating an allocation interval of demodulation reference signals (DM-RSs) belonging to a same CDM group, and the DM-RSs are transmitted to the terminal through the first PDSCH according to the allocation interval indicated by the CDM interval.

9. An operation method of a terminal in a communication system, the operation method comprising:
receiving, from a base station, a radio resource control (RRC) message including transmission configuration information (TCI)-state configuration information including information indicating a starting beam index and an ending beam index, reference signal related information, and a TCI update indicator indicating that an implicit TCI update is performed;
receiving, from the base station, a first downlink control information (DCI) including first resource allocation information to the terminal, wherein the first DCI does not include a field indicating a specific TCI; and
when the implicit TCI update is performed and the first DCI does not include the field indicating the specific TCI, receiving, from the base station, a first physical downlink shared channel (PDSCH) through a resource indicated by the first resource allocation information by using a beam #n determined among the starting beam to the ending beam according to a rule preconfigured between the base station and the terminal for the implicit TCI update.

10. The operation method according to claim 9, further comprising:
receiving, from the base station, a second DCI including a first TCI and second resource allocation information; and
receiving, from the base station, a second PDSCH through a resource indicated by the second resource allocation information by using a beam estimated based on the first TCI,
wherein the first TCI indicates the reference signal related information instead of the starting beam index.

11. The operation method according to claim 9, wherein the RRC message further includes a beam interval indicating an interval at which a beam is updated, wherein a beam used for communications between the base station and the terminal is determined among the starting beam to the ending beam according to the interval indicated by the beam interval.

12. The operation method according to claim 9, wherein the RRC message further includes beam change information indicating a time required for a change from a current beam to a next beam, wherein a beam used for communications between the base station and the terminal is changed to another beam after a lapse of the time indicated by the beam change information.

13. The operation method according to claim 9, wherein the RRC message further includes a TCI update type indicating a beam update scheme, the ending beam is used for communications between the base station and the terminal before receiving a first TCI when the RRC message indicates a TCI update type 1 and a beam used for communications between the base station and the terminal is updated to the ending beam, and the ending beam is updated to the starting beam in a cyclic shift manner when the RRC message indicates a TCI update type 2 and a beam used for communications between the base station and the terminal is updated to the ending beam.

14. The operation method according to claim 9, wherein, when the RRC message further includes a demodulation reference signal (DM-RS) interval indicating an allocation interval of DM-RSs in a frequency domain, the receiving a first PDSCH comprises:
receiving the DM-RSs through the first PDSCH according to the allocation interval indicated by the DM-RS interval; and
demodulating downlink data received through the first PDSCH based on the DM-RSs.

15. The operation method according to claim 9, wherein, when the RRC message further includes a code division multiplexing (CDM) separation parameter indicating a number of CDM groups allocated to one resource block (RB), the receiving a first PDSCH comprises:
- receiving demodulation reference signals (DM-RSs) belonging to the CDM group through the first PDSCH according to an allocation scheme determined based on information indicated by the CDM separation parameter; and
- demodulating downlink data received through the first PDSCH based on the DM-RSs.

16. The operation method according to claim 9, wherein, when the RRC message further includes a code division multiplexing (CDM) interval indicating an allocation interval of demodulation reference signals (DM-RSs) belonging to a same CDM group, the receiving a first PDSCH comprises:
- receiving the DM-RSs through the first PDSCH according to the allocation interval indicated by the CDM interval; and
- demodulating downlink data received through the first PDSCH based on the DM-RSs.

* * * * *